United States Patent [19]

de Haan

[11] 3,968,513

[45] July 6, 1976

[54] SYSTEM FOR RECORDING A COLOR TELEVISION SIGNAL WITH REDUCED BANDWIDTH

[75] Inventor: Maarten Rutger de Haan, Eindhoven, Netherlands

[73] Assignee: U.S. Philips Corporation, New York, N.Y.

[22] Filed: June 6, 1974

[21] Appl. No.: 476,785

[30] Foreign Application Priority Data

Feb. 28, 1974  Netherlands ...................... 7402692

[52] U.S. Cl. ............................. 358/4; 179/100.3 V
[51] Int. Cl.[2] ...................... H04N 5/76; H04N 9/02
[58] Field of Search ........ 358/4; 178/6.6 DD, 6.6 R; 179/100.3 V

[56] References Cited
UNITED STATES PATENTS

| 2,034,111 | 3/1936 | Miller | 179/100.3 V |
| 2,927,997 | 3/1960 | Day | 325/347 X |
| 3,660,596 | 5/1972 | Numakura | 358/4 |
| 3,715,474 | 2/1973 | Calfee et al. | 358/8 |

Primary Examiner—Robert L. Griffin
Assistant Examiner—Mitchell Saffian
Attorney, Agent, or Firm—Frank R. Trifari; Henry I. Steckler

[57] ABSTRACT

A color television system for the combined transmission of a luminance signal and a chrominance signal. The chrominance signal is added to a carrier as a frequency modulation, after which the modulated carrier is amplitude-modulated by the luminance signal. The system is extremely suited for use with a disc-shaped record carrier. The color television signal is then recorded as a trackwidth variation of a spiral track provided on the record carrier.

13 Claims, 7 Drawing Figures

SYSTEM FOR RECORDING A COLOR TELEVISION SIGNAL WITH REDUCED BANDWIDTH

The invention relates to a colour television system for transmitting a colour television signal, in particular the recording on and reproduction from a record carrier, the luminance and chrominance signals associated with said colour television signal being transmitted in combination.

Such a colour television system is known. In the known colour television system, the luminance signal is frequency-modulated on a carrier, after which said modulated signal is amplitude modulated by the chrominance signal. Said chrominance signal generally has a relatively low frequency relative to the standard chrominance signal and is derived from said standard chrominance signal by mixing the latter with a mixing signal of a suitable frequency.

Such colour television systems are especially of importance when using record carriers of limited bandwidth. The main object of such colour television systems is therefore to enable an optimum transmission of all signal components of a colour television signal within a limited bandwidth. Moreover, such a colour television system must have an optimum immunity to disturbances, such as with respect to specific defects in a transmission medium, and it is advantageous if possible timing errors can be compensated in a simple manner at the receiver side.

It is an object of the invention to provide a colour television system of the type mentioned in the preamble, which substantially meets said requirements. The invention is characterized in that the chrominance signal is transmitted as a frequency modulation of a first carrier and the luminance signal as an amplitude modulation of said frequency-modulated carrier.

The colour television system according to the invention first of all has the advantage that the overall bandwidth which is required is smaller than that of the previously cited system. This is a direct consequence of the fact that the first carrier is frequency modulated by the chrominance signal instead of by the luminance signal. In contradistinction to the frequency spectrum which is obtained in the case of frequency modulation with the luminance signal, a frequency spectrum is now obtained in which the original unmodulated carrier wave is retained. In order to be able to transmit the luminace as well, a bandwidth must be available around said carrier wave which in the case of double-sideband modulation equals twice the maximum frequency of the luminance signal.

In the known system the carrier frequency can no longer be distinguished after frequency modulation of said carrier by the luminance signal, but a certain frequency sweep occurs around the original unmodulated carrier frequency. In order to be able to transmit the luminance signal correctly, the overall bandwidth must be twice the maximum frequency of the luminance signal plus said frequency sweep.

The colour television system according to the invention furthermore has the advantage that the first carrier wave may be used as a pilot signal. Such a pilot signal is generally desirable in order to be able to compensate for timing errors that may occur during signal transmission, which eventually result in phase errors in the chrominance signal. Generally, an additional pilot signal of fixed frequency is added for this purpose. As the first carrier wave is separately available said carrier wave may readily be used as a pilot signal.

The colour television system according to the invention is of special significance when recording a colour television signal on a disc-shaped record carrier, on which a pattern of tracks is provided on which the information is recorded. In the colour television system according to the invention the information may simply be recorded as a track-width modulation. This means that the information is contained in the two track edges, which is favourable in respect of the susceptibility to disturbances, for example with respect to disturbances owing to flaws in the structure of the disc-shaped record carrier. Said trackwidth modulation can for example be obtained by exposing a disc with a photo-sensitive coating to a light-beam whose width is varied in accordance with the applied colour television signal. It is then possible to derive disc-shaped record carriers from said disc in accordance with known technologies, in which the track is recorded as a groove, which groove depending on the type of record carrier is, for example, scanned optically or capacitively.

The invention will now be described in more detail with reference to the Figures, of which FIG. 1 shows the frequency spectrum of the known colour television system, and FIG. 2 shows the frequency spectrum of the colour television system according to the invention.

FIG. 3 schematically shows the recording apparatus,

Figure 6:
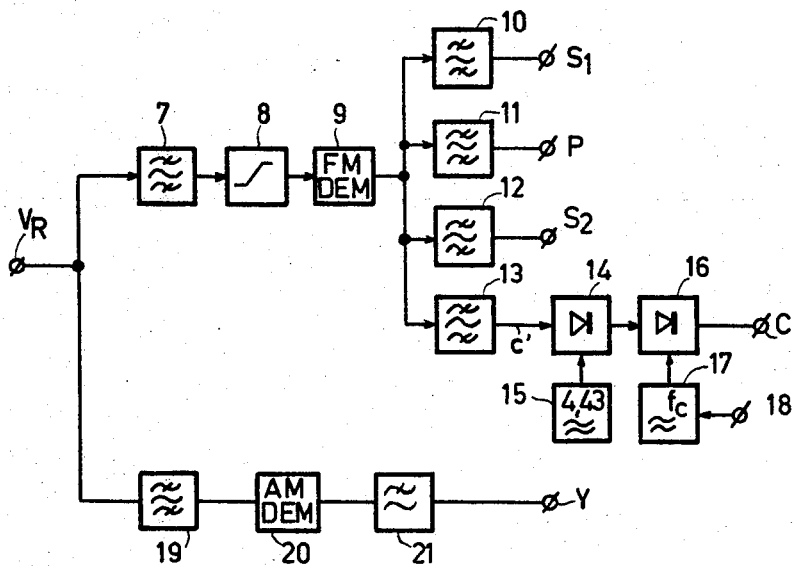

FIG. 6 schematically shows the reproduction apparatus, and

Figure 7:
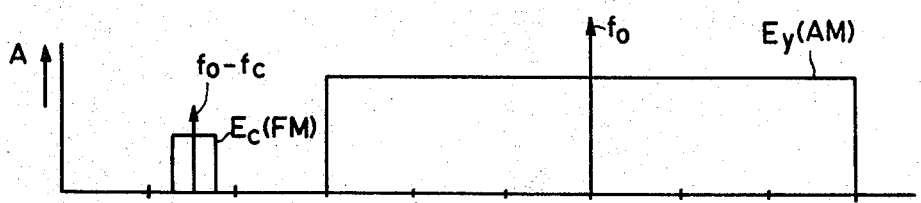

FIG. 7 finally shows the frequency spectrum of a special embodiment of the colour television system according to the invention.

Figure 1:
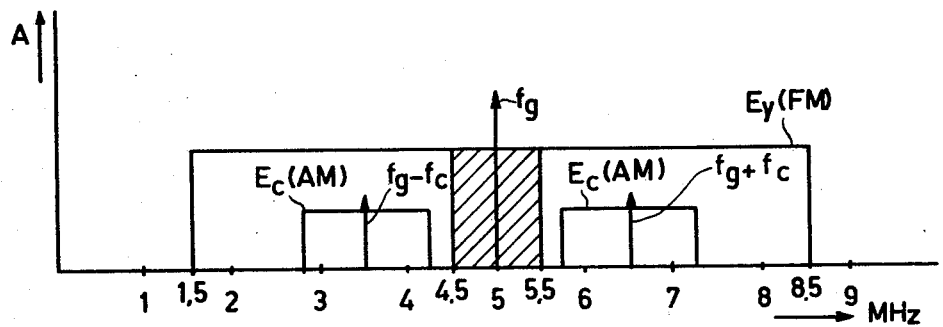

FIG. 1 shows the frequency spectrum of a colour television signal as obtained in said known colour television system. The luminance signal is frequency-modulated on a carrier, which results in an sweeping FM carrier. For said frequency sweep the frequency range of 4.5 MHz to 5.5 MHz is chosen in the present example. The lowest frequency (4.5 MHz) then corresponds to peak black of the luminance signal and the highest frequency (5.5 MHz) to peak white. The average grey level of the luminance signal corresponds to 5 MHz, the frequency of the unmodulated carrier wave $f_y$. In order to enable the luminance signal to be transmitted, one of the first-order sidebands, generally the lower sideband, must be transmitted in any case. When 3 MHz is chosen for the maximum frequency of the luminance signal, the total frequency band of the FM modulated luminance signal will extend from 1.5 MHz (4.5 − 3) to 8.5 MHz (5.5 + 3), which corresponds to the specified frequency band $E_y$ (FM).

The chrominance signal is added to said frequency-modulated luminance signal $E_y$(FM) as an amplitude modulation (AM). Said chrominance signal is not a standard chrominance signal, but a chrominance signal of a substantially lower frequency. Said chrominance signal can be derived from a standard chrominance signal in known manner by mixing said standard chrominance signal with a suitable mixing signal. It is assumed that the chrominance signal occupies a frequency band of 0.5 MHz around the chrominance carrier $f_c = 1.5$ MHz. Amplitude modulation of the frequency-modulated luminance signal $E_y$ (FM) with said chrominance signal then results in the two frequency bands $E_c$ (AM) at either side of the frequency sweep. The bandwidth of said two frequency bands $E_c$(AM) is larger than the bandwidth of the chrominance signal, because for said amplitude modulation not a fixed carrier wave is used but an instantaneous frequency which varies within the frequency sweep of the frequency-modulated luminance signal.

Figure 2:
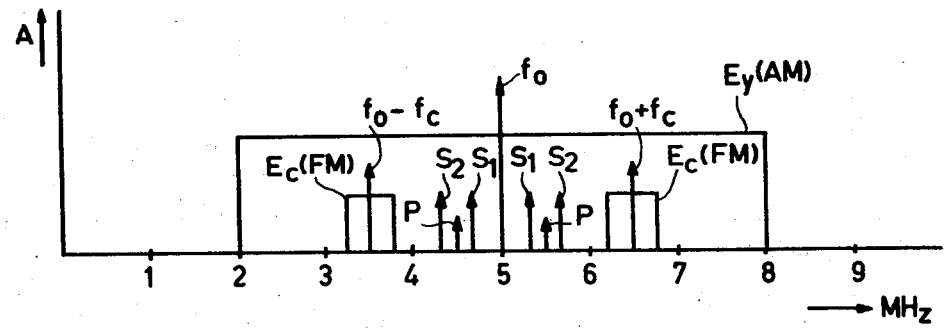

FIG. 2 by way of example shows the frequency spectrum of the colour television signal as obtained when using the colour television system according to the invention. In contradistinction to the known colour television system, it is not the luminance signal, but the chrominance signal which is added to a carrier as a frequency modulation. As carrier wave $f_o = 5$ MHz is selected and as a chrominance signal again a transposed chrominance signal is selected having a frequency range of 0.5 MHz around the chrominance carrier $f_c = 1.5$ MHz. Said frequency modulation results in a frequency spectrum consisting of the carrier wave $f_o$, the first order sidebands $E_c$ (FM) and, of course, the higher-order sidebands. The modulation index has been selected so small that said higher-order sidebands may be neglected, for which reason they are not indicated in the Figure. As the chrominance signal covers a limited bandwidth around the chrominance carrier wave of 1.5 MHz, the unmodulated carrier $f_o$ is fully maintained and can be distinguished at the fixed frequency of 5 MHz, in contradistinction to the known colour television system. The chrominance carrier has fixed frequencies of $f_o \pm f_c$ in the frequency spectrum.

Said frequency-modulated signal is then amplitude-modulated by the luminance signal. Assuming again that the bandwidth of the luminance signal is 3 MHz, then the bandwidth required for this is 6 MHz around the carrier wave $f_o$, denoted by $E_y$ (AM). This is one MHz less than in the known colour television system. Furthermore, the carrier wave $f_o$ is present, which has a fixed frequency, and which may thus serve as a pilot signal, as will be explained hereinafter. Finally, it is evident that the frequency band $E_c$ (FM) occupied by the chrominance signal has a smaller bandwidth than the frequency bands $E_c$ (AM) of FIG. 1, which is favourable in view of interaction.

In the frequency spectrum of FIG. 2, a number of additional signal components are shown at either side of the carrier wave $f_o$, viz two audio signals $S_1$ and $S_2$ and a pilot tone P, which together with the chrominance signal have been added to the carrier $f_o$ as a frequency modulation.

Figure 3:
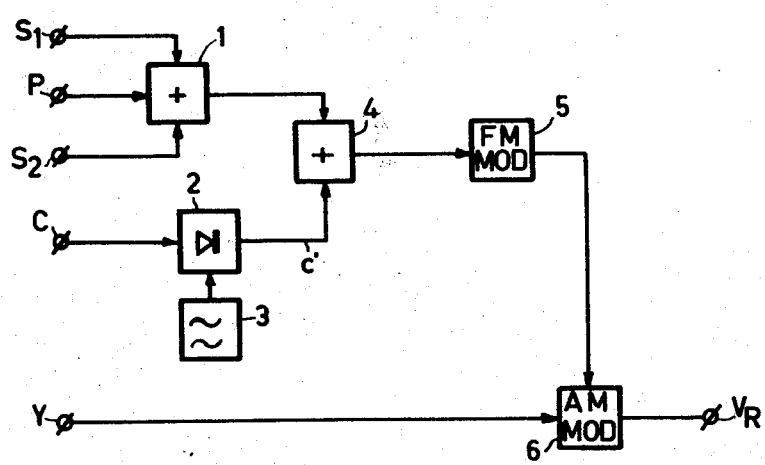

FIG. 3 schematically shows how the colour television signal with the spectrum of FIG. 2 can be obtained. The audio signal $S_1$, which is for example a frequency-modulated carrier of 350 kHz, the sound signal $S_2$, which is for example a frequency modulated carrier of 650 kHz, and the pilot tone P of for example 500 kHz, are applied to an adder circuit 1. The standard chrominance signal contained in a standard colour television signal is applied to a mixing stage 2, to which also a suitable mixing signal from an oscillator 3 is applied, so that at the output of said mixing stage a transposed chrominance signal is obtained, which is added to the sound signals and the pilot tone with the aid of adder circuit 4. Said sum signal is subsequently applied to a frequency modulator 5. The signal supplied by said FM modulator is then fed to an amplitude modulator 6 as carrier, to which modulator the luminance signal $y$ is applied as modulating signal and whose output signal is the desired colour television signal $V_R$ with the spectrum of FIG. 2.

Figure 4:
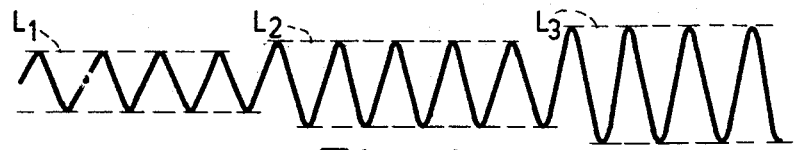
FIG. 4 shows the signal then obtained.
Figure 5:
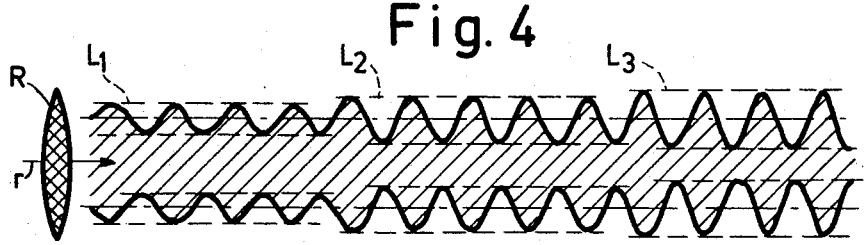
FIG. 5 shows the corresponding variation of the track of the record carrier.

FIG. 4 by way of example shows the response of said colour television signal. It is assumed that the luminance signal is consequently black ($L_1$), grey ($L_2$) and white ($L_3$), which results in three different amplitudes. In the situation shown it is assumed that said amplitude increases. However, a modulation of opposite polarity, i.e., decreasing amplitude $L_3$, $L_2$, $L_1$, may equally be employed. Said modulated signal is particularly suited to be used in a record carrier on which the information is recorded as a modulation of the track width. For example, in the case of a disc-shaped record carrier with a light-sensitive layer, said record carrier may be provided with an information-containing track, by exposing said record carrier in accordance with a spiral pattern to a light spot, whose width transverse to the longitudinal direction of the track varies as a function of the applied colour television signal. A possibility of obtaining such trackwidth variations is by varying the intensity of the light source as a function of the applied colour television signal, because the diameter of the light spot within certain limits depends linearly on said intensity variations. The variation of the trackwidth thus obtained is shown hatched in FIG. 5, from which it can be seen that the two track edges contain the information, which may be favourable in view of susceptibility to disturbances, specifically as regards flaws of the record carrier.

By means of photo-etching techniques such an exposed disc-shaped record carrier can be transformed into a record carrier in which the track takes the form of a depth profile and which is consequently suitable for mass production. Such a track may be read in different manners, for example, by means of a light spot R which moves in the longitudinal direction r of the track. The surface of the disc may then for example be made light reflecting and the deeper track groove may be light absorbing or vice versa. Alternatively, the record carrier may be provided with a conducting and a dielectric layer and the capacitance variations may be measured with the aid of a transducer, which is provided with a guide which is moved across the track, and used as a read signal.

From the detected signal, which again has the frequency spectrum of FIG. 2, the desired component may be derived in a simple manner, as is shown in FIG. 6. The signal $V_R$ which is read from the record carrier is first of all fed to a band-pass filter 19 having for example a bandwidth of 2–8 MHz. The filtered signal is applied to an AM demodulator 20, which merely detects the amplitude variations, so that after filtering with the aid of a low-pass filter 21, which has for example a bandwidth of 0–3 MHz, the luminance signal y is obtained. The detected signal $V_R$ is also fed to a band-pass filter 7 having for example a bandwidth of 3–7 MHz. The filtered signal is subsequently fed to a limiter circuit 8, so that the amplitude variations of said signal are eliminated. Said limited signal is then FM-demodulated with the aid of the FM demodulator 9. The sound signal $S_1$, the pilot tone P, the sound signal $S_2$ and the chrominance signal C' can then be derived from the demodulated signal at the output of said FM demodulator 9 with the aid of the band-pass filters 10, 11, 12 and 13 respectively. The chrominance signal C' around the chrominance carrier $f_c$ can be re-transformed into a standard chrominance signal in known manner with the aid of two mixing stages 14 and 16, the mixing stage 14 receiving the chrominance signal C' and the standard chrominance carrier (4.43 MHz) supplied by an oscillator 15. In addition to the output signal of the mixing stage 14, the mixing stage 16 receives a signal from the oscillator 17 with a frequency equal to $f_c$. The desired standard chrominance signal C is then available at the output of said mixing stage 16.

By varying the frequency of the signal supplied by the oscillator 17 in accordance with a control signal at the terminal 18, which control signal is derived from a pilot signal contained in the transmitted colour television signal, it is possible to eliminate timing errors introduced in the chrominance signal during transmission. As pilot signal for example the pilot signal P may be selected. In the colour television system according to the invention the carrier wave $f_o$ may also be used as pilot signal, so that the pilot signal P could then be dispensed with.

In order to minimize crosstalk between the luminance signal and the chrominance signal in the colour television system according to the invention, various additional steps may be taken. In order to enable the luminance signal and the chrominance signal to be separated correctly during demodulation the lower and upper sidebands of the two signal components must be processed identically, as far as possible. To compensate for a slightly falling frequency response of the transmission medium near the upper sideband, it is possible to apply amplitude correction at a later stage. For this, it is advantageous to use the two sidebands $E_c$ (FM) of the chrominance signal (FIG. 2), by each time comparing the amplitudes of the two sidebands ($E_c$) with each other during a fixed level of the luminance signal (for example the backporch of the horizontal flyback pulse) and operating an automatic gain control by means of the difference signal.

In order to reduce the influence of cross-talk of the chrorminance signal in the luminance signal in advance, a frequency interlace may be provided between the two signal components. In the case of PAL, for example the frequency $f_c$ of the chrominance signal must then equal an odd number of times the quarter line frequency, if desired increased or reduced by an additional 25 Hz component. For NTSC $f_c$ would have to be equal to an odd number of times half the line frequency.

FIG. 7 shows a special modification of the colour television signal according to the invention. The carrier wave $f_o$ is now selected at 6 MHz. The chrominance carrier $f_c$ for the chrominance signal is now selected so high that after frequency modulation of the carrier wave $f_o$ with said chrominance signal the first-order sidebands $E_c$ (FM) fall outside the bandwidth required for the luminance signal $E_y$ (AM). This may be favourable in view of mutual influencing of the two signal components. For the AM demodulation of the luminance signal single-sideband demodulation may now be used, which results in a permissible limitation of the bandwidth of the transmission medium. A special case is obtained if for the frequency $f_c$ the standard chrominance carrier wave is selected. This means that during FM modulation the standard chrominance signal is directly used as modulating signal and after demodulation and phase correction said standard chrominance signal is directly available. The corresponding frequency spectrum is shown in FIG. 7, $f_b$ being 4.43 MHz.

What is claimed is:

1. A disc-shaped record carrier provided with a spiral track on which a colour television signal is recorded, wherein said colour television signal is recorded in the track as a trackwidth modulation, the chrominance signal being recorded as a frequency modulation of a carrier and the luminance signal as an amplitude modulation of said frequency modulated carrier.

2. A system for recording a color television signal having luminance and chrominance components, said system comprising a frequency modulator having an input means for receiving said chrominance component and an output means for supplying a frequency modulated first carrier signal; and an amplitude modulator having a first input means for receiving said luminance component, a second input coupled to said frequency modulator output, and an output means for supplying said frequency modulated signal amplitude modulated by said luminance component.

3. A colour television system as claimed in claim 2, wherein said chrominance component has a carrier frequency interlaced with respect to the first carrier frequency.

4. A colour television system as claimed in claim 2, wherein the chrominance component has a carrier frequency having a lower frequency than the standard chrominance carrier.

5. A colour television system as claimed in claim 2, wherein the chrominance component and the luminance component contained in the transmitted signal occupy separate frequency bands.

6. A colour television system as claimed in claim 5, wherein the chrominance signal comprises the standard chrominance signal.

7. A colour television system as claimed in claim 2, further comprising a disc-shaped record carrier, and means for recording the amplitude modulator output signal on the disc in the form of trackwidth variations.

8. A colour television system as claimed in claim 7, wherein said recording means comprises an optical modulator whose luminous intensity varies with the applied signal.

9. A system for reproducing a color television signal having a luminance component amplitude modulating a first carrier signal frequency modulated by the chrominance component, said system comprising an input means for receiving said recorded signal; an amplitude demodulator having an input coupled to said input means, and an output means for supplying said luminance component; and a frequency demodulator having an input coupled to said input means, and an output means for providing said chrominance component.

10. A color television system as claimed in claim 9, wherein the first carrier comprises a pilot tone for correction of recording timing errors.

11. A system as claimed in claim 10 wherein said errors comprise chrominance signal phase errors.

12. A system as claimed in claim 9 further comprising a limiter coupled between said input means and said frequency demodulator input.

13. A system as claimed in claim 12 further comprising a bandpass filter coupled between said limiter and said input means.

* * * * *